G. B. PICKOP.
GREASE CUP.
APPLICATION FILED NOV. 2, 1917.
1,310,630.
Patented July 22, 1919.
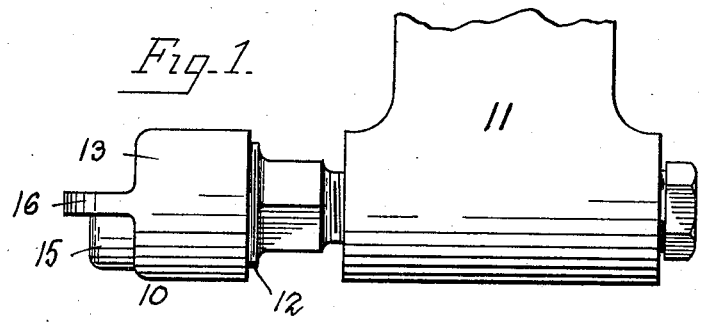
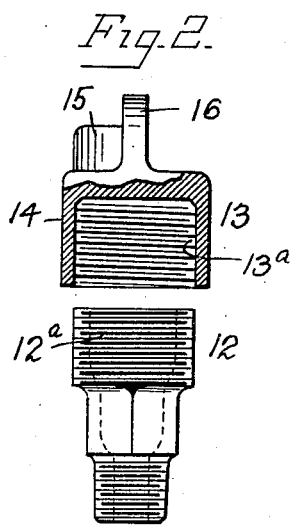
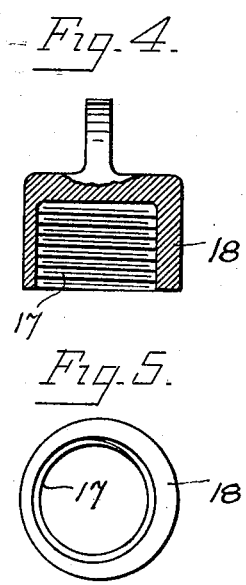
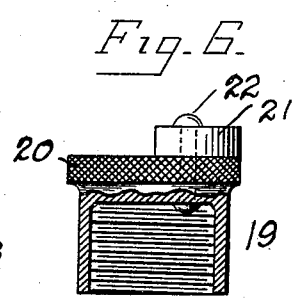
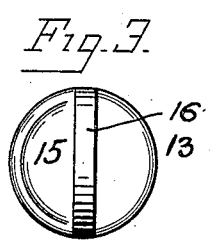
Inventor:
George B. Pickop,
By
Attorney

UNITED STATES PATENT OFFICE.

GEORGE B. PICKOP, OF NEW HAVEN, CONNECTICUT, ASSIGNOR TO THE MALLEABLE IRON FITTINGS COMPANY, OF BRANFORD, CONNECTICUT, A CORPORATION OF CONNECTICUT.

GREASE-CUP.

1,310,630.

Specification of Letters Patent.

Patented July 22, 1919.

Application filed November 2, 1917. Serial No. 199,843.

*To all whom it may concern:*

Be it known that I, GEORGE B. PICKOP, a citizen of the United States, residing in the city and county of New Haven, State of Connecticut, have invented certain new and useful Improvements in Grease-Cups, of which the following is a full, clear, and exact description.

This invention relates to grease cups which are commonly used for holding lubricating grease that is to be supplied or fed to a certain part or parts to be lubricated. The grease cup ordinarily has a cap in threaded engagement with the body thereof, which cap serves to inclose and protect the grease in the body of the cup, and also acts as a follower which forces the grease out of the bottom of the cup to the joint or part to be lubricated when the cap is screwed down on the body.

Where articles of this nature have been used on automobiles and other movable machinery, considerable inconvenience and annoyance have been caused by loss of the caps. In the case of an automobile, for example, the vibration of the car frequently causes the cap to work loose and fall off as, ordinarily, no provision is made for retaining the cap in a definite angular relation with respect to the body or cup proper, and when the cup drops off the car the chances of finding it are usually very small, and in any case a good deal of annoyance is caused.

The primary object of my present invention is to provide an improved grease cup wherein the cap will be effectively retained in a definite angular relation to the body, so that the former cannot become entirely unscrewed merely as a result of shocks or vibration to which the device is subjected.

Another object of my invention is to provide a grease cup cap which can be readily adjusted by screwing it up or down on the cup, but which, nevertheless, when once adjusted will not be turned, by shocks or vibration, in an unscrewing direction sufficiently to cause it to fall off the cup proper.

Still another object of my invention is to provide a grease cup cap in which the center of gravity is located eccentrically with respect to the threaded socket in the cap, whereby the unscrewing movement due to vibration or the like will be resisted and counteracted by an eccentric weight.

To these and other ends, the invention consists in the novel features and combinations of parts to be hereinafter described and claimed.

In the accompanying drawing:

Figure 1 is a side elevation of a grease cup embodying my improvements, showing it located in a horizontal position and applied to the frame of an automobile;

Fig. 2 shows the body and cap detached from each other, the body being in elevation and the cap being partly in elevation and partly in section;

Fig. 3 is a top plan view of the cap shown in Fig. 2;

Fig. 4 is a central section, partly in elevation, of a modified form of cap;

Fig. 5 is a bottom view of Fig. 4; and

Figs. 6 and 7 show a still further modified form of cap.

In Fig. 1, I have shown a grease cup 10 embodying my improvements, associated with the frame member 11 of an automobile. In this instance, the cup may be assumed as serving to lubricate a joint between one end of the frame member 11 and one of the automobile springs. In this particular case, the cup is located horizontally, and the body portion or cup proper 12 being filled with grease, the screwing up of the cap 13 on the body in the customary manner will force the grease horizontally through the cup bottom to the joint, as usual. It will be understood, however, that I do not limit myself to an arrangement in which the cup is horizontally disposed, or at least my invention is not so limited in all its aspects, as will hereinafter appear. As shown in Fig. 2, the body portion 12 of the cup is provided with the customary exterior screw threads 12$^a$, and the cap has a depending flange 14 forming a socket with interior screw threads 13$^a$ adapted to engage the threads on the body.

In accordance with my invention, I distribute the weight of the cap 13 in such a manner that the center of gravity is located eccentrically with respect to the socket having the threads 13$^a$. In the form shown in Fig. 2, a weight 15 is cast integral with the cap at one side of the customary diametrical wing or finger piece 16. This weight 15 is located eccentrically with respect to the cylindrical part of the cap which engages the body portion 12. In the particular form shown, it is of approximately semi-cylindrical shape, being located wholly at one side of the wing 16. It has been found that a weight of this kind effectively resists and counteracts an unscrewing impulse of the cap caused by vibration or the like. When the cup is placed horizontally, as shown in Fig. 1, the cap will tend to take a position in which the weight 15 is lowermost, as will be understood, and the cap will be held on the body by gravity acting on the cap at the place where the weight 15 is applied. As the cap is held by gravity approximately in the position shown in Fig. 1, it will be understood that it will be impossible for it to become unscrewed on the body or even to make one complete turn thereon, as the weight 15 effectively resists any such movement. It has been found, however, that the weight will act effectively to prevent the unscrewing of the cap even when the cup is inclined but slightly to the vertical position, since when the axis about which the cap rotates lies in any position but the vertical the eccentric weight will tend to remain at the lower portion of the plane in which it rotates. The resistance the eccentric weight will offer to a force tending to rotate the cap varies with the angle its axis makes with the vertical plane and of course will operate most effectively to prevent the cap from unscrewing from its cup when the axis of the grease cup lies in a horizontal plane.

In Figs. 4 and 5, I have shown another form of cap in which the weight is distributed eccentrically with respect to a screw threaded socket 17 in the cap, by making the wall 18 of the socket of varying thickness at different points in the circumference. The screw threaded socket of the cap is located eccentrically with respect to the cap body, as shown, so that the wall is thicker at one side than at the other.

In Figs. 6 and 7, I have shown a cap 19 with a knurled rim 20 and with a separate eccentric weight 21 applied by rivets 22 or the like to the top of the cap.

Other modifications of the device may be made without departing from the scope of the invention as defined in the claims.

What I claim is:

1. In combination with a part to be lubricated, a grease cup applied thereto with its axis inclined to the vertical position, a cap threaded upon said cup and having its center of gravity located eccentrically with respect to the axis about which it rotates, whereby said cap is prevented from rotating upon said cup sufficiently to accidentally unscrew the same through a complete revolution.

2. A grease cup cap having cup engaging threads and having its center of gravity disposed eccentrically with respect to said threads to thereby resist the rotation of said cap upon its threads.

3. The combination with a part to be lubricated, of a grease cup applied thereto with its axis substantially horizontal and comprising a body portion and a cap in threaded engagement with each other, the center of gravity of said cap being located eccentrically with respect to the body-engaging threads, whereby the cap is prevented from turning in an unscrewing direction sufficiently to disengage it from the body.

4. The combination with an automobile frame, of a grease cup applied thereto with its axis substantially horizontal and comprising a body and threaded cap, said cap having an eccentric weight thereon to prevent it from unscrewing.

In witness whereof, I have hereunto set my hand on the 26th day of October, 1917.

GEORGE B. PICKOP.

Copies of this patent may be obtained for five cents each, by addressing the "Commissioner of Patents, Washington, D. C."